(12) United States Patent
Bogart

(10) Patent No.: US 9,700,014 B1
(45) Date of Patent: Jul. 11, 2017

(54) GAME FEEDER

(71) Applicant: Mark Bogart, Joshua, TX (US)

(72) Inventor: Mark Bogart, Joshua, TX (US)

(73) Assignee: MBIP-I, LLC, Joshua, TX (US)

( * ) Notice: Subject to any disclaimer, the term of this patent is extended or adjusted under 35 U.S.C. 154(b) by 0 days.

(21) Appl. No.: 15/094,835

(22) Filed: Apr. 8, 2016

Related U.S. Application Data

(63) Continuation-in-part of application No. 14/091,118, filed on Nov. 26, 2013, now abandoned.

(51) Int. Cl.
*A01K 5/00* (2006.01)
*A01K 5/02* (2006.01)

(52) U.S. Cl.
CPC .................................. *A01K 5/0225* (2013.01)

(58) Field of Classification Search
CPC ............................... A01K 5/02; A01K 5/0225
USPC ........ 119/57.91, 57.92, 51.11; 239/681, 687, 239/668, 665
See application file for complete search history.

(56) References Cited

U.S. PATENT DOCUMENTS

| | | | | |
|---|---|---|---|---|
| 1,239,404 A | * | 9/1917 | Knoll | B05B 12/02 119/51.15 |
| 7,866,579 B2 | * | 1/2011 | Chism | A01C 17/001 119/57.91 |
| 8,893,653 B2 | | 11/2014 | Browning et al. | |
| 2002/0014545 A1 | * | 2/2002 | Woodruff | A01C 15/02 239/650 |
| 2014/0131468 A1 | | 5/2014 | Meritt | |

* cited by examiner

*Primary Examiner* — Viet Le
(74) *Attorney, Agent, or Firm* — Eric Karich; Karich & Associates

(57) ABSTRACT

A game feeder has a hopper body for storing the feed material, a feed outlet, a funnel extending downwardly from around the feed outlet opening to a lower aperture, and a cylindrical feeder tube that extends from around the funnel to an upper perimeter that further from the hopper body than the funnel. A lower housing has an annular wall that extends upwardly to a lower perimeter, which may include an outwardly extending annular flange. Support struts in the form of rods connect the lower housing to the hopper body to support the hopper body above the lower housing, such that the upper perimeter of the feeder tube is adjacent but spaced from the lower perimeter of the annular wall of the lower housing, to form an annular feed discharge slot therebetween.

1 Claim, 3 Drawing Sheets

GAME FEEDER

CROSS-REFERENCE TO RELATED APPLICATIONS

This application for a utility patent is a continuation-in-part of a previously filed utility patent, currently pending, having the application Ser. No. 14/091,118, filed Nov. 26, 2013.

BACKGROUND OF THE INVENTION

Field of the Invention

This invention relates generally to animal feeders, and more particularly to a game feeder for spreading feed material to attract and feed deer and other animals.

Description of Related Art

A common type of particulate spreader comprises a distribution member, such as a spinning disc, mounted for rotation about an upwardly extending rotary axis. Material such as seeds is typically directed from such as a hopper, through an outlet port in the container and onto a spinning disc. On contact with the upper surface of the spinning disc centrifugal force spreads the material in an outward radial from the spinning disc. A common problem with such spreaders is leakage of material through the outlet port of the container when the spreader s not in use.

Chism, U.S. Pat. No. 7,866,579, teaches a spreader for spreading feed material, which includes an upper bracket, a shaft, a return spring, a lower bracket, first and second sets of chain links, and a spreader plate. The upper and lower brackets are preferably aligned in the same vertical plane. The first and second chain links are located on opposite sides of the spreader and on either side of the shaft. Upon rotation of the spreader the first and second sets of chain links experience a centrifugal force sufficient to cause the spreader plate to move down the shaft and upon ceasing rotation the spreader plate returns to a default position proximate to the top of the shaft.

Browning, U.S. Pat. No. 8,893,653, teaches an animal feeder that has a square motor housing that includes slots in the sides to enable feed distribution. However, a square motor housing with slots in the sides result in the inefficient distribution of feed due to the shape of the corners of the housing.

The prior art teaches various forms of game feeders. However, the prior art does not teach a game feeder that is resistant to theft of the feed material by raccoons and other wildlife, and that provides superior spreading of the feed material around the game feeder. The present invention fulfills these needs and provides further advantages as described in the following summary.

SUMMARY OF THE INVENTION

The present invention teaches certain benefits in construction and use which give rise to the objectives described below.

The present invention provides a game feeder for scattering a feed material. The game feeder includes a hopper body for storing the feed material, a feed outlet, a funnel extending downwardly from around the feed outlet opening to a lower aperture, and a cylindrical feeder tube that extends from around the funnel to an upper perimeter that further from the hopper body than the funnel. A lower housing has an annular wall that extends upwardly to a lower perimeter, which may include an outwardly extending annular flange. Support struts in the form of rods connect the lower housing to the hopper body to support the hopper body above the lower housing, such that the upper perimeter of the feeder tube is adjacent but spaced from the lower perimeter of the annular wall of the lower housing, to form an annular feed discharge slot therebetween.

A primary objective of the present invention is to provide a game feeder having advantages not taught by the prior art.

Another objective is to provide a game feeder that is resistant to theft of the feed material by raccoons and other wildlife.

A further objective is to provide a game feeder whose annular construction and rod supports provide superior spreading of the feed material around the game feeder.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a game feeder 10 for scattering a feed material 12 on a ground.

Figure 1:
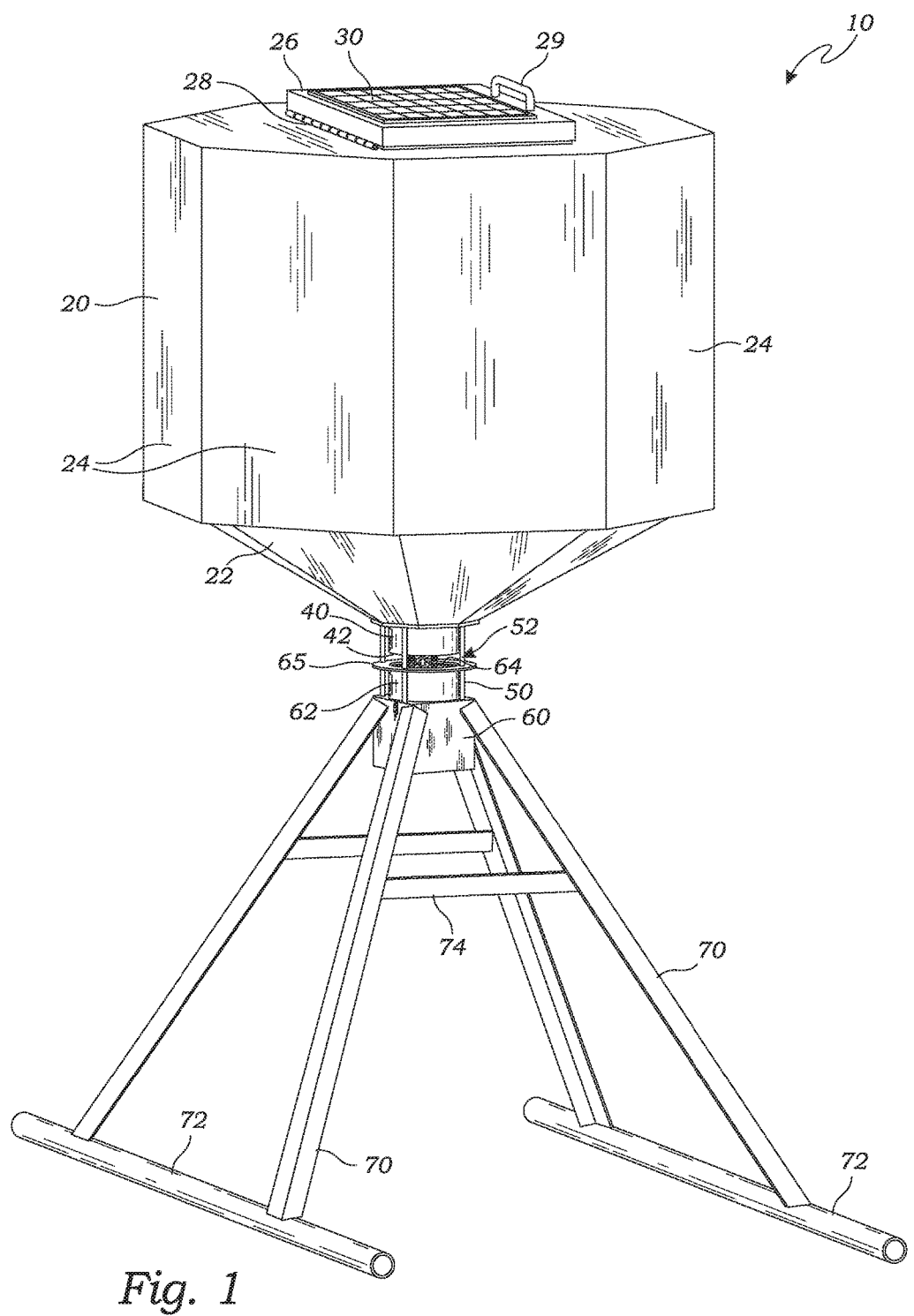
FIG. 1 is a perspective view of a game feeder according to one embodiment of the present invention.
Figure 2:
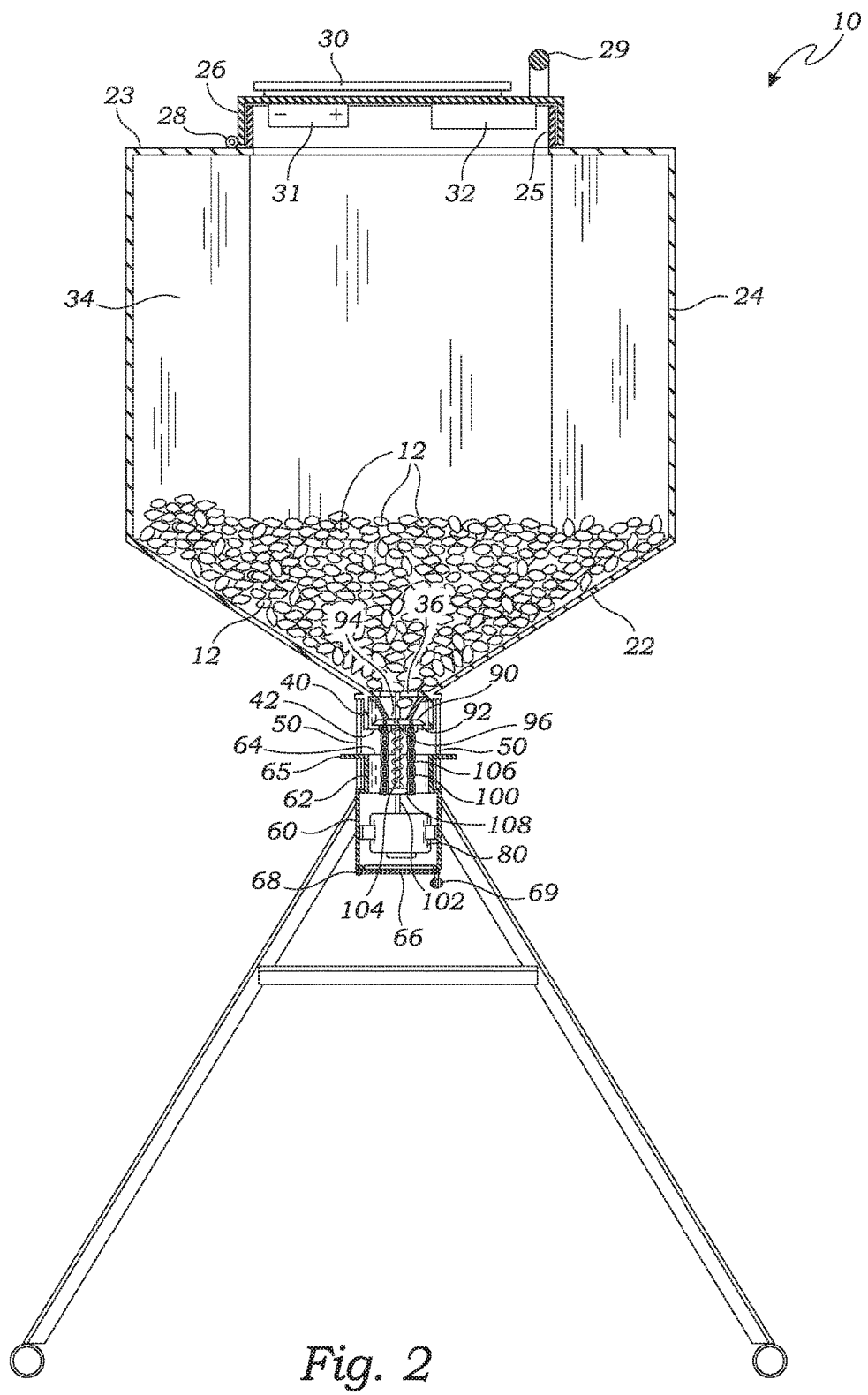
FIG. 2 is a side elevational sectional view thereof, illustrating a feed spreader in a closed position.

FIG. 1 is a perspective view of the game feeder 10 according to one embodiment of the present invention. FIG. 2 is a side elevational sectional view of the game feeder 10. As illustrated in FIGS. 1 and 2, the game feeder 10 of this embodiment has a hopper body 20 for containing the feed material 12. In this embodiment, the hopper body 20 includes a bottom wall 22, a top wall 23, side walls 24, a flange 25, and a cover 26 that together define a hopper interior 34 for storing the feed material 12. The bottom wall 22 may be of any shape, inverted pyramidal, parabolic upward, funnel-shaped, or even horizontal. In the present embodiment the bottom wall 22 is comprised of six plates that form a roughly pyramidal shape, though with six segments instead of four, at their widest point where they connect to the side walls 24.

A feed outlet opening 36 extends through the hopper body 20, in this case through the bottom wall 22 of the hopper body 20, where the feed material 12 may fall through and escape from the hopper interior 34. The side walls 24 may extend generally vertically from the bottom wall 22 and serve to contain the feed material 12. In the present application, the side walls 24 are made of eight connected vertical plates, though may have more or fewer sides. The side walls 24 may even be of one side, if the side walls 24 were of cylindrical construction. While FIG. 1 illustrates one embodiment of the hopper body 20, those skilled in the art may devise alternative embodiments, and these alternative or equivalent are considered within the scope of the present invention.

The hopper body 20 may also have a cover 26 for protecting the feed material 12 from the elements and from theft by animals prior to being scattered upon the ground. The cover 26 may be attached to a top wall 23, or alternative to the side walls 24. The cover 26 may be attached to the top wall 23 with a hinge 28 for opening the cover 26. There may be a flange 25 which extends vertically from the top wall 23. The flange 25 is for sealing the cover tightly over and preventing water or other debris from entering the hopper interior 34. Alternatively, the cover 26 may be connected to the hopper body 20 at the flange 25 rather than the top wall 23. The cover 26 may have a handle 29 for opening the cover 26 to add more of the feed material 12. While FIG. 1 illustrates one embodiment of the cover 26, those skilled in the art may devise alternative embodiments, and these alternative or equivalent are considered within the scope of the present invention.

A feeder tube 40 may be attached to the hopper body 20 at the bottom wall 22. The feeder tube 40 extending downwardly from around the feed outlet opening 36 to an upper perimeter 42. The feeder tube 40 is for directing the feed material 12 which falls from the hopper interior 34 through the feed outlet opening 36. The feeder tube 40 may be of any shape, cylindrical, rectangular, octagonal, etc. and in the present embodiment is cylindrical. While FIG. 1 illustrates one embodiment of the feeder tube 40, those skilled in the art may devise alternative embodiments, and these alternative or equivalent are considered within the scope of the present invention.

The present invention also may include the support struts 50 that extend from a lower housing 60 to the hopper body 20 to support the upper perimeter 42 a distance from a lower perimeter 64 to form an annular feed discharge slot 52 that is not obstructed by the base legs 70. The support struts 50 may be made quite thin as they may also tend to be quite short, and thus resist buckling. The thinness of the support struts 50 is chosen to cause the least amount of interference possible when the game feeder 10 is in use. The support struts 50 may be cylindrical rods or tubes, square rods or tubes, or any generally elongate vertical support structure. The support struts 50 may also be of a triangular truss work for increasing the mechanical strength of the support struts 50 for supporting the hopper body 20. The support struts 50 may also be angled outward to deflect any of the feed material 12 outward into the desired feeding zone. While FIG. 1 illustrates one embodiment of the support struts 50, those skilled in the art may devise alternative embodiments, and these alternative or equivalent are considered within the scope of the present invention.

Beneath the feeder tube 40 may be the lower housing 60 that includes an annular wall 62 that extends upwardly to the lower perimeter 64. In the present embodiment, the lower perimeter 64 of the annular wall 62 includes an outwardly extending annular flange 65. In the present embodiment, the outwardly extending annular flange 65 has a square shape so that the corners may receive through and be secured to the support struts 50.

The lower housing 60 may contain a motor 80 and other components used in a retracting mechanism 100 as described below in the description of FIG. 2. The lower housing 60 may be connected to the support struts 50 and provide a base for the support struts 50 when supporting the hopper body 20. The lower housing 60 may also include a door 66 to gain access to the interior of the lower housing 60, a door lock 69 operably connected to the door 66 for locking the door, and a door hinge 68 operably connecting the door 66 to the lower housing 60 allowing the door 66 to open and close. While FIG. 1 illustrates one embodiment of the lower housing 60, those skilled in the art may devise alternative embodiments, and these alternative or equivalent are considered within the scope of the present invention.

The base legs 70 may be attached to the lower housing 60 for supporting the lower housing 60 above the ground. Typically there may be three or four legs arranged in a pyramidal pattern for providing a stable base to the game feeder 10. The base legs 70 may be connected to each other by horizontal foot bars 72 to prevent the base legs 70 from sinking into loose soil. The base legs 70 may also have support rungs 74, which may also be horizontal and connecting one or more of the base legs 70 for providing additional stability and support strength. While FIG. 1 illustrates one embodiment of the base legs 70, those skilled in the art may devise alternative embodiments, and these alternative or equivalent are considered within the scope of the present invention.

The lower housing 60, as introduced in the discussion of FIG. 1, may also contain a feed spreader 90 and the retracting mechanism 100 connected to the motor 80. The retracting mechanism 100 may have a rotating element 108, a spring 104, a guide shaft 102, and a weighted tension element 106.

The feed spreader 90 may be positioned within the annular wall 62 of the lower housing 60 and extending upwardly into the feeder tube 40 to cover the feed outlet opening 36. The feed spreader 90 may be a cylindrical plate and may further contain a feed disc 92, a spreader wall 94 and an aperture 96. The spreader wall 94 are for giving angular momentum to the feed material 12 before it escapes the feed spreader 90 and keeping it from bouncing away prior to distribution about the game feeder 10. The spreader walls 94 may be vertical walls attached to the perimeter of the feed spreader 90. In another embodiment, the spreader wall 94 may be a single vertical wall extending across the diameter of the feed disc. The aperture 96 may be shaped to allow the guide shaft 102 to extend through the aperture 96 and keep the feed spreader 90 horizontally positioned as it is raised or lowered. There may also be additional apertures and guide shafts for preventing any twisting of the feed spreader 90 relative to the spring 104 as it rotates.

The present embodiment may include a funnel 44 operably connected to the bottom wall 22 of the hopper body 20 and centered on the feed outlet opening 36, having an upper aperture 45 and a lower aperture 46, centrally aligned on a common axis, wherein the area of the upper aperture 45 is larger than the area of the lower aperture 46 and serves to further collimate the downward flow of the feed material 12. In the closed state with the feed disc 92 abutting the lower aperture 46 of the funnel 44.

In one embodiment, the rotating element 108 may be a planar component operably connected to the motor 80 such that when the motor 80 is running, the rotating element 108 spins. The rotating element 108 is for mounting the other components of the retracting mechanism 100 as described below. The rotating element 108 may be connected to the guide shaft 102 which may be a rod or tube that may extend upwardly from the center of the rotating element 108. The guide shaft 102 is used to hold the feed spreader 90 in place as it moves up and down when the retracting mechanism 100 retracts the feed spreader 90. While FIG. 2 illustrates one embodiment of the rotating element 108 and the guide shaft 102, those skilled in the art may devise alternative embodiments, and these alternative or equivalent are considered within the scope of the present invention.

The spring 104 may be of any type known to one skilled in the art, and is for providing an upward force sufficient to keep the feed spreader 90 firmly abutting the lower aperture 46 of the funnel 44 and sealing the feed outlet opening 36 when the feed spreader 90 is not rotating via the motor 80. The spring 104 may be placed in the center of the underside of the feed spreader 90 and connects the feed spreader 90 to the motor 80. The spring 104 may surround the guide shaft 102 in a coaxial manner or may be placed adjacent to the guide shaft 102. While FIG. 2 illustrates one embodiment of the spring 104, those skilled in the art may devise alternative embodiments, and these alternative or equivalent are considered within the scope of the present invention.

There may be one or more of the weighted tension elements 106 that, when rotating via the motor 80, are used to pull down the feed spreader 90 against the upward force of the spring 104. There may be one, two, or more of the weighted tension elements 106 arranged generally vertically around the spring 104 and connecting the feed spreader 90 to the motor 80. The weighted tension elements 106 may be chains, bands, ropes, cables, or any other flexible material known to one skilled in the art. In another embodiment, the weighted tension elements 106 may also be rigid bodies connected by hinges that allow the ends of the weighted tension elements 106 to be brought together. The weighted tension elements 106 may also have additional weights (not shown) for providing additional angular momentum when rotating, rather than relying solely on the mass of the weighted tension element 106 itself. While FIG. 2 illustrates one embodiment of the weighted tension elements 106, those skilled in the art may devise alternative embodiments, and these alternative or equivalent are considered within the scope of the present invention.

The motor 80 mounted in the lower housing 60 is for rotating the feed spreader 90, the guide shafts 102, the spring 104, and the weighted tension elements 106. The motor 80 may be powered by a battery 31 attached, in the present embodiment, to the bottom of the cover 26. In other embodiments, the motor 80 may be powered by other batteries, or by an external power source such as an electrical cord. The motor 80 may be of any type known to one skilled in the art, such as electric, gasoline, etc. The motor 80 may have a central axle (not shown) which may be affixed to the rotating element 108 that is connected to the weighted tension elements 106, the guide shafts 102, and the springs 104. While FIG. 2 illustrates one embodiment of the motor 80, those skilled in the art may devise alternative embodiments, and these alternative or equivalent are considered within the scope of the present invention.

Also shown in FIG. 2 is a section of the cover 26, which may also include a solar panel 30, the battery 31 for providing power when the solar panel 30 is not able to be used, or for being recharged by the solar panel 30, and a timer 32 for releasing energy from the battery 31. The solar panel 30 may be of any kind known to one skilled in the art for the collecting of energy from sunlight and converting it into an electrical current to operate the motor 80 or recharge the battery 31. The battery 31 may be connected to the motor 80 for providing power to rotate the feed spreader 90. The battery 31 may be rechargeable by the solar panel 30, or provide a backup power capacity if the solar panel 30 is unable to provide power at the prescribed feeding times. The timer 32 may be any kind of timer known to one skilled in the art capable of activating the game feeder 10 at one or more set times. The timer 32 may also specify a feeding duration during each of the feeding times. The timer 32 may go off at uniform intervals, or have a more complicated program where the intervals or durations of feedings are adjusted according to the hour, day, season, etc. While FIG. 2 illustrates one embodiment of the solar panel 30, the battery 31, and the timer 32, those skilled in the art may devise alternative embodiments, and these alternative or equivalent are considered within the scope of the present invention.

Figure 3:
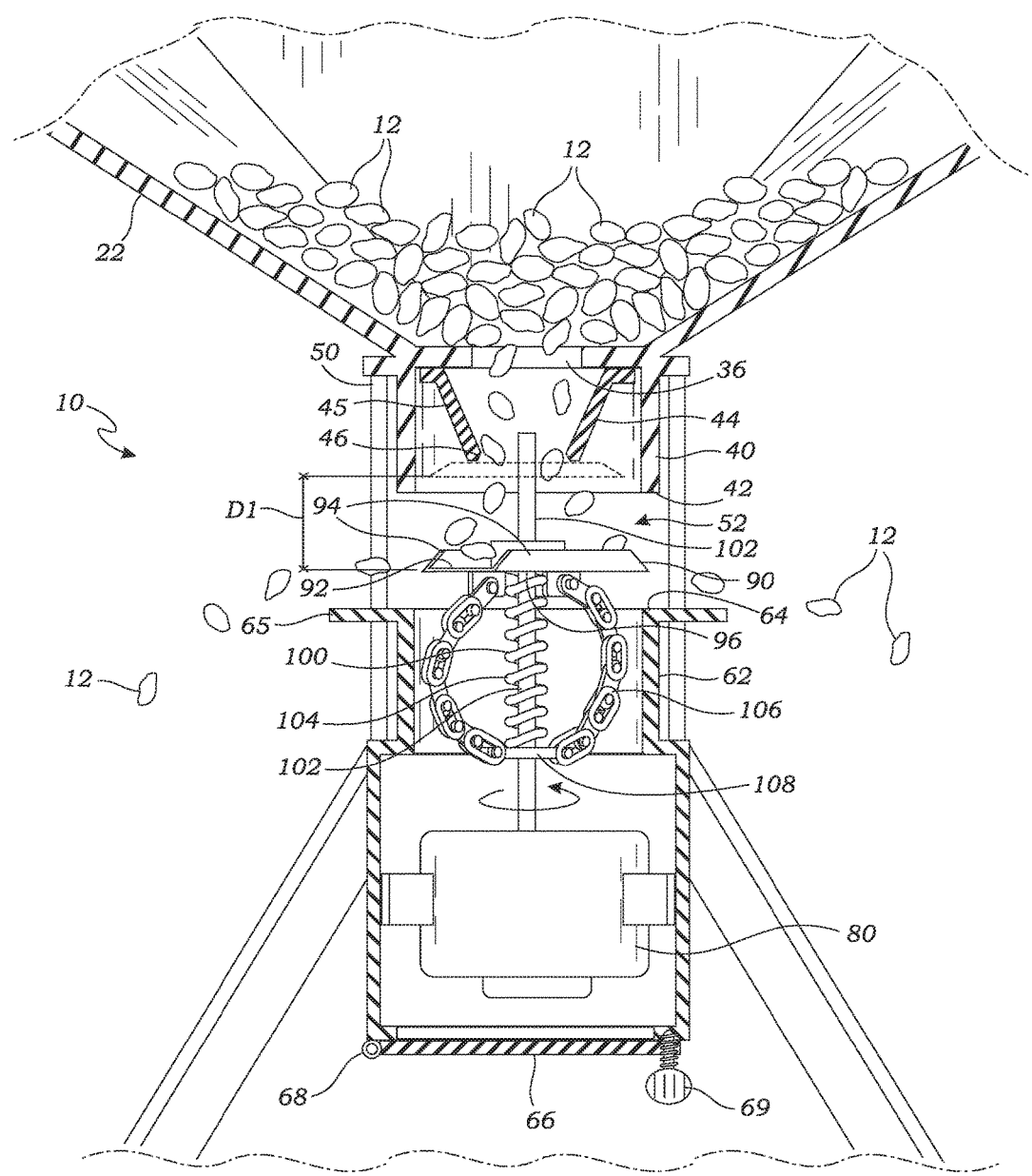
FIG. 3 is a side elevational sectional view of the feed spreader portion of the game feeder, illustrating the feed spreader in an open position for distributing feed material.

FIG. 3 is a side elevational sectional view of the feed spreader 90 portion of the game feeder 10, illustrating the feed spreader 90 in an open position for distributing feed material 12. As illustrated in FIG. 3, when the motor 80 spins the feed spreader 90, the feed spreader 90 moves downwardly to uncover the feed outlet opening 36 and scatters the feed material 12 through the annular feed discharge slot 52. The downward motion of the feed spreader 90 is due to the rotation of the weighted tension elements 106 that experience a centripetal force when rotating about the axis of the rotating element 108. The weighted tension element 106 translates the centripetal force to a downward force on the feed spreader 90, compressing the spring 104 and lowering the feed spreader 90 away from the feed outlet opening 36. As the feed material 12 falls through the feed outlet opening 36 onto the feed disc 92 of the feed spreader 90, the feed material 12 is pushed by the spreader wall 94 and given an angular velocity. The feed material 12 then slides along the spreader wall 94 until it reaches the edge of the feed disc 92 where it is then ejected into the desired area about the game feeder 10 for consumption. The spring constant of the spring 104, the mass distribution of the weighted tension element 106 and the rotation of the feed spreader 90 may be adjusted by one skilled in the art to give the desired distribution pattern of the feed material 12. Also, the annular feed discharge slot 52 formed between the upper perimeter 42 and the lower perimeter 64 may be adjusted by selecting different lengths of the support struts 50, the feeder tube 40, or the annular wall 62, in order to have the desired collimation of the ejected feed material 12.

During operation, the feed disc 92 is pulled down a distance D1 from the lower aperture 46, which places the feed disc 92 adjacent slot 52. When the feed disc 92 is in the closed position abutting the lower aperture 46 of the funnel 44, it is positioned entirely within the feeder tube 40. When the feed disc 92 is in the open position, it is outside of the feeder tube 40. The feeder tube 40 functions to exclude animals from getting to the funnel 44 to attempt to steal the feed material 12, without interfering with the scattering of the feed material 12.

As shown in FIGS. 1-3, the lower perimeter 64 of the annular wall 62 includes an outwardly extending annular flange 65. The outwardly extending annular flange 65 serves to direct the feed material 12 for superior distribution. In one embodiment, the outwardly extending annular flange 65 is disposed on a plane that is perpendicular to an axis of the guide shaft 102. In one embodiment, the outwardly extending annular flange 65 has a square shape (viewed from above) so that its corners may receive through and be secured to the support struts 50.

As used in this application, the words "connecting," "attaching," and "mounting," are taken to mean any method or combination of steps needed to attain the desired operative result. For example, such methods may include welding, bolting, gluing, tying, clamping, or any other intermediate steps known to one skilled in the art for the purposes of manufacturing the present invention.

As used in this application, the words "a," "an," and "one" are defined to include one or more of the referenced item unless specifically stated otherwise. Also, the terms "have,"

"include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A game feeder for scattering a feed material, the game feeder comprising:
   a hopper body that defines a hopper interior for storing the feed material;
   a feed outlet opening through the hopper body;
   a lower housing having a motor;
   an annular wall that extends upwardly from the lower housing to a lower perimeter, the annular wall having a smaller diameter than the lower housing;
   an annular flange that extends outwardly from the lower perimeter of the annular wall
   support struts that connect the lower housing to the hopper body to support the hopper body above the lower housing, such that the feed outlet opening positioned above and spaced from the lower perimeter of the annular wall, to form an annular feed discharge slot therebetween;
   a feed spreader shaped and sized to cover the feed outlet opening;
   a retracting mechanism operably connected to the feed spreader and the motor, the retracting mechanism comprising:
      a guide shaft operably connected to the motor and extending upwardly through an aperture of the feed spreader, the guide shaft being positioned beneath the feed outlet but not contacting the hopper body;
      a rotating element attached to the guide shaft such that the rotating element rotates with the guide shaft;
      a spring between the rotating element and the feed spreader, for biasing the feed spreader upwardly to a closed position wherein the feed spreader blocks the flow of the feed material; and
      a pair of weighted tension elements connecting the rotating element and the feed spreader, such that when the pair of weighted tension elements spin, the feed spreader is pulled downwardly by the pair of weighted tension elements to uncover the feed outlet opening, catch the feed material that falls downwardly through the feed outlet opening, and scatter the feed material through the annular feed discharge slot;
   wherein the retracting mechanism extends from the space surrounded by the annular wall to above the annular flange;
   wherein the feed spreader moves relative to the annular wall and the annular flange via the retracting mechanism; and
   at least one base leg attached to the lower housing for supporting the lower housing, wherein the at least one base leg is beneath the feed spreader and does not block the annular feed discharge slot.

* * * * *